United States Patent [19]

Suzuki

[11] 3,824,621

[45] July 16, 1974

[54] MULTI-CHANNEL TAPE PLAYING DEVICE

[75] Inventor: Kozi Suzuki, Yoshida Oizumi Gumma, Japan

[73] Assignees: Tokyo Sanyo Electric Co., Ltd., Gunma; Sanyo Electric Co., Ltd., Osaka, both of, Japan

[22] Filed: June 8, 1972

[21] Appl. No.: 261,098

[30] Foreign Application Priority Data

June 8, 1971 Japan .............................. 46-11778
June 10, 1971 Japan .............................. 46-11779

[52] U.S. Cl. .................. 360/78, 179/1 GQ, 360/64, 360/94

[51] Int. Cl.... H04h 5/00, G11b 21/08, G11b 23/18

[58] Field of Search .......... 179/100.2 Z, 100.2 MD, 179/100.4 ST, 15 BT, 100.1 TD, 100.1 S, 1 GP, 1 GQ

[56] References Cited

UNITED STATES PATENTS 3,632,886 1/1972 Scheiber ........................ 179/15 BT
3,640,538 2/1972 Tolar ........................... 179/100.2 Z
3,697,692 10/1972 Hafler ............................ 179/1 GQ

*Primary Examiner*—Alfred H. Eddleman
*Attorney, Agent, or Firm*—Armstrong, Nikaido & Wegner

[57] ABSTRACT

A device for playing the voices recorded in the tapes in such a form as to assure a perfect compatibility between the two channel stereo program tape and the four channel stereo program tape, wherein upon automatically discerning, at the time of playing, whether the tape program belongs to the two channel or four channel, the result is indicated to the operator, and in the case of four channel program tape, the signals of each channel are individually reproduced, while in the case of two channel program tape, they are automatically reproduced in simulation to the four channel program.

6 Claims, 1 Drawing Figure

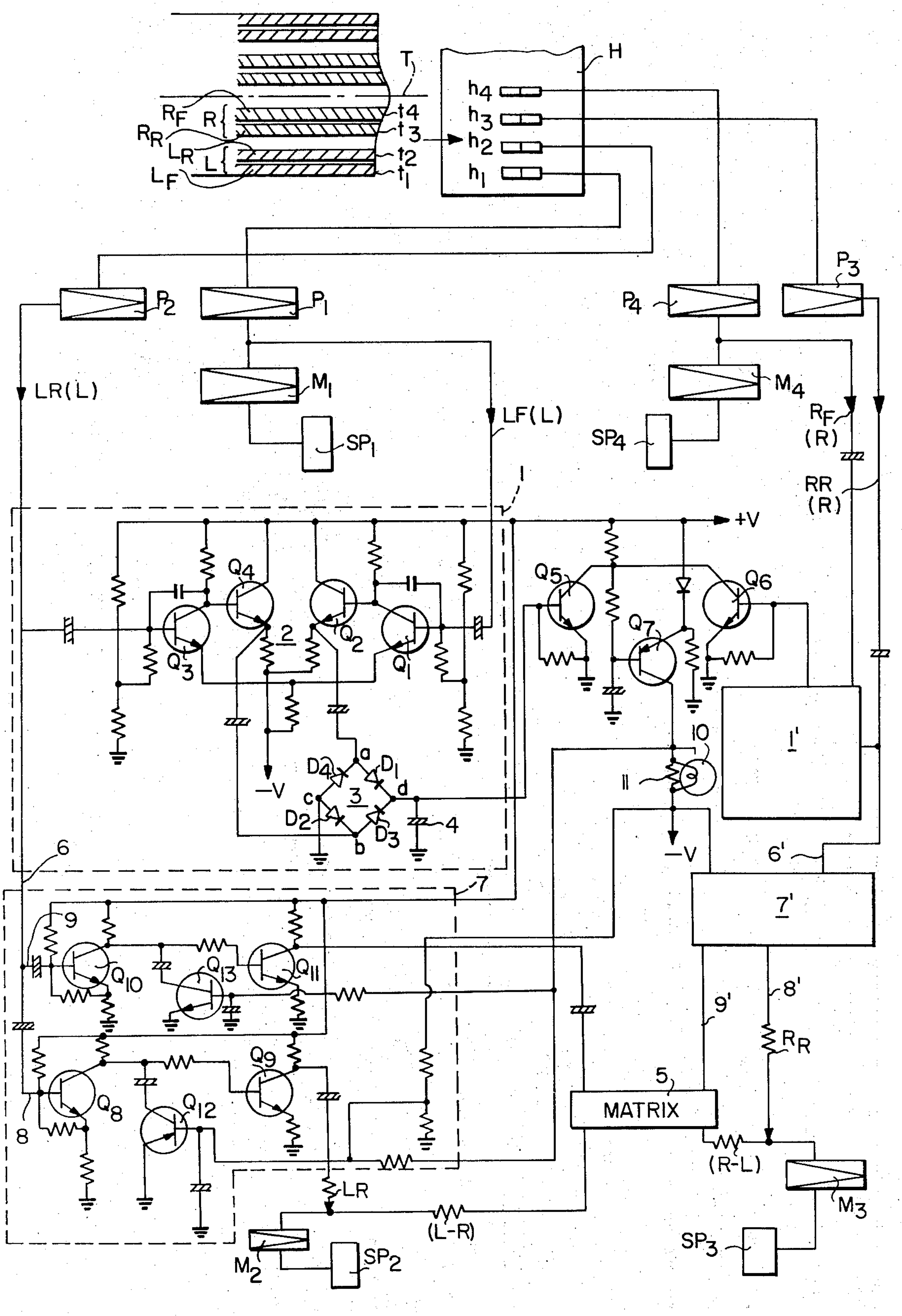
H
T
h4
h3
h2
h1
RF
R
RR
LR
L
LF
t4
t3
t2
t1
P1
P2
P3
P4
M1
M2
M3
M4
SP1
SP2
SP3
SP4
LR(L)
LF(L)
RF (R)
RR (R)
+V
-V
Q1
Q2
Q3
Q4
Q5
Q6
Q7
Q8
Q9
Q10
Q11
Q12
Q13
D1
D2
D3
D4
a
b
c
d
1
2
3
4
5
6
7
8
9
10
11
1'
6'
7'
8'
9'
MATRIX
RR
(R-L)
LR
(L-R)

MULTI-CHANNEL TAPE PLAYING DEVICE

BACKGROUND OF THE INVENTION

The present invention may provide a means wherein in the cassette tapes of a system in which recording is made on a pair of magnetic tracks used for recording the two channel program source which is further bisected for recording especially four channel program source in the magnetic tape, and whether the tape presented for playing has the two channel program or the four channel program is automatically discerned and indicated to the operator. Furthermore, it also relates to a four channel tape playing device characterized in that when the playing device as the so-called simulated multi-channel playing function of reproducing the conventional two channel program in simulation with more than two channel programs, in addition to the so-called discrete four channel playing function of individually reproducing each channel signal of the four channel program, the tape program is automatically detected and discerned at the time of reproducing and playing, and then, in correspondence with the tape program, the switching is automatically made between the four channel playing function and the simulated multi-channel playing function.

SUMMARY OF THE INVENTION

Recently, with regard to cassette tapes, for example, studies have been made of the practical applications of the system of making the recording with a pair of magnetic tracks used for recording the two channel program source which are further bisected, for recording the four channel program source in the magnetic tape. According to such a system, the recorded signals in the two channel program tape may be reproduced in a four channel tape playing device, while those in the four channel program tape may also be reproduced in a two channel tape playing device, so that a perfect compatibility may be assured between the playings with these two tapes. It is, however, difficult in the playings with these tapes for which the compatibility is assured to discern whether the tape presented for the playing has the two channel program or the four channel program. This raises a problem when the user recorded both the two channel program source and the four channel program source divided in the same tape, and afterwards, wants to reproduce them successively. If any device capable of automatically discerning the type of source and indicating the result to the user is made available, it must be very useful for such a user. For, then, the user, having this knowledges, may be enabled to selectively set the playing device at once to the two channel playing or the four channel playing in accordance with the tape program thus detected, or to make the switching between the discrete four channel playing and the so-called simulated four channel playing of playing the two channel program in simulation with the four channel playing. That is to say, while, the matrix circuit system, the delaying system, etc., for extracting or forming the residual sound component from each channel signal for the conversion to the simulated multi-channel signals are available, in the four channel tape playing device having both functions are well known, the operation of adequately making the switching between the discrete four channel playing and the simulated multi-channel playing in correspondence with the tape program detected is still necessary. For the user to make the manual switching is very troublesome, because the frequent switchings with one tape are required when the user recorded by himself both an the two channel program source and the four channel program source divided on the same tape, and afterward, he wants to reproduce them successively.

Accordingly, the object of this invention is to provide a four channel tape playing device equipped with a means capable of automatically discerning whether the tape program is two channel or of the four channel when the two channel program source and the four channel program source are recorded in such a way as to assure compatibility between their playings. It is also another object of this invention to provide a four channel tape playing device so composed that with regard to the tape in which the two channel program source and the four channel program source are recorded in such a way as to assure compatibility between their playings, the tape program may be automatically detected and discerned, at the reproduction and playing, and then, the automatic switching between the discrete four channel playing function and the simulated multichannel playing function may be made accordingly.

BRIEF DESCRIPTION OF THE DRAWING

The accompanying drawing indicates an electric circuit diagram, showing a preferred embodiment of this invention.

DESCRIPTION OF THE PREFERRED EMBODIMENT

A preferred embodiment of this invention is described in detail hereunder with reference to the accompanying drawing:

The tape (T) is provided with four magnetic tracks ($t_1$) – ($t_4$) on its half-width. When the program source has four channels, the left and right main signals (LF) (RF) are recorded in the tracks ($t_1$) ($t_4$), and the left and right auxiliary signals (LR) (RR) in the tracks ($t_2$) ($t_3$). When the program source has two channels, the left side signal (L) is recorded in the total track area of the neighboring tracks ($t_1$) ($t_2$) put together, and the right side signal (R) in the total track area of the neighboring tracks ($t_3$) ($t_4$) put together. The magnetic regenerating head (H) has four head elements ($h_1$) – ($h_4$) corresponding to the tracks ($t_1$) – ($t_4$), and the head elements ($h_1$) – ($h_4$) are respectively associated with preamplifiers ($P_1$) – ($P_4$).

According to this invention, detecting devices (1) (1') adapted to detect the signal difference between the head elements ($h_1$) ($h_2$) belonging to the left system, and that between the head elements ($h_3$) ($h_4$) belonging to the right system. In this diagram, the detecting device (1') of the right system, shown by a block, is, in the actual composition, identical with the detecting device of the left system, which is composed of differential amplifier (2) having directly joined two transistors ($Q_1$) ($Q_2$) and ($Q_3$) ($Q_4$) associated in the way of providing the differential amplification and full wave rectifying circuit (3) having four diodes bridge-connected. The aforementioned amplifier (2) is disposed to work as a device of equilibrating type by leading the signals coming from the pre-amplifiers ($P_1$) ($P_2$) to the respective bases of the transistors ($Q_1$) ($Q_3$) at both sides. Thus, the signal corresponding to the difference between the base input signals is taken out as the emitter-follower from each emitter of the transistors ($Q_2$) ($Q_4$), and is, then, led to the input terminals (*a*) (*b*) of the full wave rectifying circuit (3). One output terminal (*c*) of this bridge rectifying circuit (3) is directly grounded, while between the other output terminal (*d*) and the ground, a condenser (4) is inserted, and the charging voltage of this condenser (4) is impressed on the base of the first switching transistor ($Q_5$). The detecting device (1') of the right system shown by a block has the identical composition to that of the detecting device (1) of the left system. In this device, when the signals detected at the 2 head elements ($h_3$) ($h_4$) belonging to the right system differ from one another, the D.C. signal corresponding to the signal difference is led to the base of the second switching transistor ($Q_6$). Then, the first and second switching transistor ($Q_5$) ($Q_6$) are linked to the control transistor ($Q_7$) in the way of providing a logic OR circuit, so that when at least one of these switching transistors is inverted to ON, the control transistor ($Q_7$) is also inverted to ON, and a pilot lamp (10) is wired to the collector of the said control transistor ($Q_7$).

According to this invention, while both of the aforementioned detecting devices (1) (1') are not necessarily required, and the provision of one detecting device is sufficient for the purpose as a matter of principle, they are arranged for each left and right system as described above, so that the signal difference, between the tracks ($t_1$) ($t_2$) and that between the tracks ($t_3$) ($t_4$), respectively, the left and right systems may be detected; in this way, the reliability in the discernment of the program is improved.

According to this invention, the matrix circuit (5) and switching devices (7) (7') inserted in the signal lines from the head elements ($h_2$) ($h_3$) corresponding respectively to the tracks ($t_2$) ($t_3$) in which the left and right auxiliary signals (LR) (HR) are recorded are provided. In this diagram, the switching device (7') of the right system, shown by a block, actually has a composition identical with that of the switching device (7) of the left system. These switching devices (7) (7') include the first signal systems (8) (8') respectively, which may serve to lead the signals from the signal lines (6) (6') directly to the main amplifiers ($M_2$) ($M_3$), and the second signal systems (9) (9') which may serve to lead these signals to the matrix circuit; in the signal systems (8) (9), the two directly coupled transistors ($Q_8$) ($Q_9$) and the other transistors ($Q_{10}$) ($Q_{11}$) are, respectively, arranged with by-pass transistors ($Q_{12}$) ($Q_{13}$) being inserted respectively. These by-pass transistors, being of the conductivity types provided opposite to each other, have their bases commonly connected to the collector of the aforementioned control transistor. Then, the pair of output terminals of the matrix circuit (5) are respectively associated with the main amplifiers ($M_2$) ($M_3$).

In the following, the operation of the device of this invention composed as described herein above is described: When the tape (T) has the four channel program as shown in the diagram, respective different signals are recorded in the tracks ($t_1$) ($t_2$) and ($t_3$) ($t_4$). Then, the D.C. signal corresponding to the difference between the main signal (LF) and the auxiliary signal (LR) of the left system may be obtained between the output terminals (*c*) (*d*) of the full wave rectifying circuit of the detecting device of the left system, while the D.C. signal corresponding to the difference between the main signal (RF) and the auxiliary signal (RR) of the right system is obtained between the output terminals of the full wave rectifying circuit of the detecting device (1') of the right system, whereby both of the first and the second switching transistors ($Q_5$) ($Q_6$) are inverted to ON, and as a consequence, the control transistor ($Q_7$) is also inverted to ON. As the transistor ($Q_7$) is inverted to ON, the pilot lamp (10) is turned on. Then, the collector potential rises due to the collector resistance (11); as a result, in each of the switching devices (7) (7'), the by-pass transistor ($Q_{12}$) is inverted to OFF, and ($Q_{13}$) to ON, respectively. In the next place, because the second signal systems (9) (9') of each of the switching devices (7) (7') are being grounded through the by-pass transistor ($Q_{13}$), the signals of the signal lines (6) (6'), prevented from reaching the matrix circuit, are led respectively to the main amplifiers ($M_2$) ($M_3$) through the first signal systems (8) (8'). Accordingly, the left and right main signals (LF) (RF) detected by the head elements ($h_1$) ($h_4$) are led to the speakers ($SP_1$) ($SP_4$) arranged at the left and right front to the listener, while the left and right auxiliary signals (LR) (RR) detected at the head elements ($h_2$) ($h_3$) are led to the speakers ($SP_2$) ($SP_3$) arranged at the left and right rears to the listener respectively through the preamplifiers ($P_2$) ($P_3$), signal lines (6) (6'), the first signal systems (8) (8') and the main amplifiers ($M_2$) ($M_3$). In this way, it is made possible to enjoy the discrete four channel stereo-playing.

On the other hand, when the tape (T) has the two channel program, each of the two head elements ($h_1$) ($h_2$) and ($h_3$) ($h_4$) belonging to the left and right systems respectively detect each of the identical left and right signals (L) (R); accordingly, with no signal difference existing between the head elements ($h_1$) ($h_3$) and between ($h_3$) ($h_4$), all of the first and the second switching transistors ($Q_5$) ($Q_6$) as well as the control transistor ($Q_7$) are inverted to OFF. As the control transistor ($Q_7$) is made OFF, the pilot lamp (10) is turned off, and the collector potential drops; consequently, in the left and right switching devices (7) (7'), the by-pass transistor ($Q_{12}$) is inverted to ON, and ($Q_{13}$) to OFF, respectively. Accordingly, the first signal system (8) (8') in each of the switching device (7) (7') are grounded through the bypass transistor ($Q_{12}$); as the result, the signals from the signal lines (6) (6'), prevented from reaching the main amplifier ($M_2$ ) ($M_3$) through the first signal system (8) (8'), are led to the matrix circuit through the second system (9) (9'). Accordingly, when the tape (T) has the two channel program, the left and right signals (L) (R) are detected by the two head elements ($h_1$) ($h_2$) and ($h_3$) ($h_4$), respectively. The signals detected by the head elements ($h_1$) ($h_4$) are led to the left and right speakers ($SP_1$) ($SP_4$) respectively through the pre-amplifiers ($P_1$) ($P_4$) and the main amplifiers ($M_1$) ($M_4$), while the signals (L) (R) detected by the head elements ($h_2$) ($h_3$) are respectively led to the matrix circuit (5) through the pre-amplifiers ($P_2$) ($P_3$), signal lines (6) (6'), and the second signal system (9) (9'). In this matrix circuit (5), where the residual components are to be extracted, as is well known, these signals are, then, converted to difference signals (L-R) (R-L) or other auxiliary signals. These auxiliary signals are respectively led to the left and right rear speakers ($SP_2$) ($SP_3$) through the main amplifiers ($M_2$) ($M_3$). In this way, the simulated four channel stereo playing performed with the two channel program modified in simulation to the four channel may be enjoyed.

It is also to be noted that the device of this invention may be altered in many ways. Thus, this invention is applicable to those devices in which the delaying system making use of other magnetic or acoustic mechanisms of the matrix circuit system illustrated as a means for creating a simulated channel is used. Moreover, will regard to the switching device, such mechanical contacts as relay, etc., may be employed in place of the noncontact type device illustrated. While the aforementioned matrix circuit is used for the regular matrix four channel to form the rear signals only in the description above, but it is capable of providing the switching operation of the front signals, when it is used for the logic matrix four channel, etc.

What is claimed:

1. A multichannel tape reproducing system for reproducing two channel or four channel stereo tapes said device comprising:

a. first head means, aligned with the LF channel of a four channel tape and with the L channel of a two channel tape for reproducing the signals recorded thereon;

b. second head means, aligned with the LR channel of a four channel tape and with the L channel of a two channel tape for reproducing the signals recorded thereon;

c. third head means, aligned with the RR channel of a four channel tape and with the R channel of a two channel tape for reproducing the signals recorded thereon;

d. fourth head means, aligned with the RF channel of a four channel tape and with the R channel of a two channel tape for reproducing the signals recorded thereon;

e. first detecting means, coupled to said first and second head means, for producing a signal when the output of said first head means is different from the output of said second head means;

f. control circuit means, coupled to said first detecting means, having a first state when said first detecting means produces a signal and having a second state when said first detecting means does not produce a signal;

g. first and second switching means, coupled to said control means, wherein said switching means respectively direct the output of said second and third head means directly to speaker means when said control means is in its first state and respectively direct the output of said second and third head means to said speaker means through a stereo matrix means when said control means is in its second state, and wherein the output of said first and fourth head means are applied directly to speaker means;

h. whereby said first detecting means automatically detects if said tape has two or four channels recorded thereon and produces an output signal in accordance therewith which causes said system to be automatically configured for reproducing a four channel signal when said tape has four channels recorded thereon and for reproducing a two channel signal when said tape has two channels recorded thereon.

2. The system of claim 1 further including second detecting means, coupled to said third and fourth head means, for producing a signal when the output of said third head means is different from the output of said fourth head means, wherein said second detecting means is coupled to said control circuit means such that said control circuit means is in its first state when either or both of said first and second detecting means produces a signal.

3. The system of claim 2 wherein said first and second detecting means each comprise a differential amplifier for producing a difference signal between the outputs of the respective head means coupled thereto and rectifier means for rectifying said difference signal wherein said rectified difference signal is applied to said control circuit means.

4. The system of claim 1 wherein said control circuit means includes indicator means for indicating whether said circuit is in its first or second state.

5. The system of claim 1 wherein first switching means comprises:

a. first path means coupled directly to said speaker means;

b. second path means coupled to said stereo matrix;

c. first bypass means for grounding said first path means when said control circuit is in its second state whereby the signal applied from the respective head means to each said switching means is applied to said stereo matrix; and d. second bypass means for grounding said second path means when said control circuit means is in its first state whereby the signal applied from the respective head means to each said switching means is applied directly to said speaker means.

6. A multichannel tape reproducing system for automatically configuring the system in accordance with the signals recorded on said tape, said system comprising:

a. head means for reproducing the signals recorded on each channel of said tape;

b. detecting means for comparing predetermined ones of said signals and for producing a first output when the comparison indicates said recorded signal is a two channel signal and for producing a second output when the comparison indicates said recorded signal is a four channel signal;

c. output means for reproducing said signals, said output means including a plurality of speaker means and a stereo matrix means; and, d. switching means connected between said head means and said output means and coupled to and controlled by said detecting means for directly coupling said head means to said speaker means when said detecting means produces said second output and for directly coupling a first group of said head means to a first group of said speaker means and for coupling a second group of said head means to a second group of said speaker means through said matrix means when said detecting means produces said first output.

* * * * *